United States Patent
Prow et al.

(10) Patent No.: US 6,789,736 B2
(45) Date of Patent: Sep. 14, 2004

(54) DISTRIBUTED ARCHITECTURE FOR MAGNETIC FARE CARD PROCESSING

(75) Inventors: Robert Prow, Santee, CA (US); John Decarli, San Francisco, CA (US)

(73) Assignee: Cubic Corporation, San Diego, CA (US)

(*) Notice: Subject to any disclaimer, the term of this patent is extended or adjusted under 35 U.S.C. 154(b) by 10 days.

(21) Appl. No.: 10/225,547

(22) Filed: Aug. 21, 2002

(65) Prior Publication Data

US 2003/0042307 A1 Mar. 6, 2003

Related U.S. Application Data

(60) Provisional application No. 60/313,996, filed on Aug. 22, 2001.

(51) Int. Cl.[7] ................................................ G06K 7/08
(52) U.S. Cl. ..................................................... 235/449
(58) Field of Search ................................ 235/449, 384, 235/482, 436, 483; 360/44; 365/171

(56) References Cited

U.S. PATENT DOCUMENTS

| | | | |
|---|---|---|---|
| 4,047,229 A | 9/1977 | Kobylarz et al. | |
| 4,141,044 A | 2/1979 | Kistner et al. | |
| 4,173,026 A | 10/1979 | Deming | |
| 4,529,872 A | 7/1985 | Dinges | |
| 4,670,643 A | 6/1987 | Hain et al. | |
| 4,788,420 A | 11/1988 | Chang et al. | |
| 4,977,502 A | 12/1990 | Baker et al. | |
| 5,019,696 A | 5/1991 | Chang et al. | |
| 5,089,694 A | 2/1992 | Zerfahs et al. | |
| 5,225,666 A | 7/1993 | Amarena et al. | |
| 5,254,843 A | 10/1993 | Hynes et al. | |
| 5,274,218 A | * 12/1993 | Urata et al. ................. | 235/449 |
| 5,298,726 A | 3/1994 | Aubrey | |
| 5,367,581 A | 11/1994 | Abel et al. | |
| 5,455,408 A | 10/1995 | Urata et al. | |
| 5,689,105 A | 11/1997 | Mizoguchi et al. | |
| 5,912,446 A | 6/1999 | Wong et al. | |
| 6,049,478 A | 4/2000 | Walley et al. | |
| 6,053,415 A | 4/2000 | Norwood | |
| 2002/0158122 A1 | 10/2002 | Fisher, Jr. | |

FOREIGN PATENT DOCUMENTS

| | | |
|---|---|---|
| EP | 0441280 | 8/1991 |
| EP | 0565759 | 10/1993 |
| JP | 53017797 | 2/1978 |
| JP | 59195380 | 11/1984 |
| JP | 63126080 | 5/1988 |

* cited by examiner

Primary Examiner—Mark Tremblay
Assistant Examiner—Lisa M. Caputo

(57) ABSTRACT

A process for encoding and decoding data on the magnetic stripe of a card at any bit density is provided. Data is read from the magnetic stripe of a card and transmitted to a single board computer. The single board computer receives the data and determines if the bit density of the cards is supported by the computer. If the bit density is supported, the data is sent to a demodulator object to be demodulated and converted to a data stream of ASCII characters. The data stream is then decoded, unpacked and sent to a ticket validator to check the validity of the data. If the bit density is not supported by the computer, a demodulator object supporting the bit density can be instantiated.

36 Claims, 3 Drawing Sheets

DISTRIBUTED ARCHITECTURE FOR MAGNETIC FARE CARD PROCESSING

CROSS-REFERENCES TO RELATED APPLICATIONS

This application claims the benefit of priority of U.S. provisional application Serial No. 60/313,996 filed Aug. 22, 2001 which is incorporated herein by reference in its entirety.

FIELD OF THE INVENTION

The present invention relates to a system and method for reading and writing to magnetic stripe cards containing different bit densities.

BACKGROUND OF THE INVENTION

Cards or fare media containing magnetic stripes store information or data on the magnetic stripe. Various types of information, such as account information for credit cards, personal information used by the Department of Motor Vehicles is stored on the magnetic stripe on driver licenses in some states and information relating to transit systems. For cards used in transit systems, information such as the monetary value remaining on the card, where a patron enters the transit system and where the patron exits the system can be stored on the magnetic stripe of the card. Upon exiting the transit system, the fee for the ride is automatically deducted from the card and the new value is encoded on the magnetic stripe.

Card readers are utilized to read the information from the card. There are different kinds of card readers, such as "swipe" machines which a patron physically slides the card through and "insertion" machines which capture the card and returns the card after completion of the transaction. The card readers are reading or decoding flux transitions off of the magnetic strip. A flux transition is a location (interface) on the magnetic stripe where the magnetic particles on the two sides of the interface have like poles facing each other, i.e. a South-South or a North-North interface, resulting in a concentration of magnetic flux at the interface. The combination of all these flux transitions represent the data stored on the card.

Flux transitions are encoded onto the magnetic stripe which is made of a ferromagnetic material. Ferromagnetic materials are substances that retain magnetism after an external magnetizing field is removed. This principle is the basis of all magnetic recording and playback. Magnetic poles always occur in pairs within magnetized material and magnetic flux lines emerge from the north pole and terminate at the south. The ferromagnetic material contain ferromagnetic particles, each of which acts like a tiny bar magnetic. The elemental magnetic particles are aligned with their North-South axes parallel to the magnetic stripe by means of an external magnetic field. If a magnetic particle is placed in a strong external magnetic field of the opposite polarity, it will reverse its own polarity (North becomes South, South becomes North. An unencoded magnetic stripe is a series of North-South magnetic particles.

However, if a South-South is created on the magnetic stripe, the fluxes will repel, and there will be a concentration of flux lines around the South-South interface (same with a North-North interface). Encoding the magnetic stripe on a card consists of creating South-South and North-North interfaces, and reading the card consists of detecting these flux transitions or flux reversals.

The external magnetic field used to flip the polarities is produced by a solenoid, which can reverse its polarity by reversing the direction of current. The field of the solenoid is concentrated across a gap in the solenoid, and when elemental magnetic particles of the magnetic stripe are exposed to this field, they polarize to the opposite (unlike poles attract). Movement of the stripe past the solenoid gap during which the polarity of the solenoid is reversed will produce a single flux reversal. To erase a magnetic stripe, the encoding head is held at a constant polarity and the entire stripe is moved past it. If there are no flux transitions, there is no data stored on the magnetic stripe.

Flux transitions are only created the instant the solenoid changes polarity. If the solenoid were to remain at is current polarity, no further flux reversals would be created as the magnetic stripe moves from right to left. If the solenoid gap polarity was changed from North-South to South-North, then a North-North flux transition would be instantly created. For each and every reversal in solenoid polarity, a single flux reversal is created. An encoded magnetic stripe is just a series of flux reversals (North-North followed by South-South followed by North-North).

Another solenoid called a read head is used to detect these flux transitions. The read head operates on the principle of electromagnetic reciprocity; current passing through a solenoid produces a magnetic field at the gap, therefore, the presence of a magnetic field at the gap of a solenoid coil will produce a current in the coil. The strongest magnetic fields on a magnetic stripe are at the points of flux transitions. These are detected as voltage peaks by the reader, with +/− voltages corresponding to North-North/South-South flux transitions. Data is encoded in "bit cells", the frequency of which is the frequency of '0' signals. '1' signals are exactly twice the frequency of '0' signals One of the problems with magnetic media is that different applications have different requirements in terms of bit density and encoding format. Differences in the requirements cause time consuming and expensive changes to media reader/writers. As such, media reader/writers can only accept cards of a specific bit density.

SUMMARY OF THE INVENTION

It is one object of the present invention to provide a system that requires no knowledge of the bit density or data format of the media being processed.

It is another object of the present invention to encode and decode data onto the magnetic stripe of a card at any bit density.

In the present invention, a method or process of decoding and encoding information on the magnetic stripes of cards of various bit densities is provided. In this method, a card is inserted into a card reader, placed onto a transport belt and passed under magnetic read/write heads for encoding or decoding. A shaft encoder is utilized to determine the velocity of the transport belt. The velocity of the belt is transmitted to a single board computer, over a high speed communications link, in the preamble of a message and is used to determine the bit density of the card. The data read from the card is sent to the single board computer in the body of the message.

The single board computer determines what the bit density of the card is and demodulates and decodes the data. To demodulate the data, the single board computer sends the data to a demodulator object that supports the bit density of the card. The demodulator object receives the data and converts the data to a data stream of ASCII characters representing the data that was encoded on the magnetic stripe of the card. If the single board computer does not have a demodulator object that can support the bit density of the card, a new demodulator object can be instantiated which supports this bit density. The data stream is then sent to a decoder object that decodes and unpacks the data stream. From there the data stream is sent to a ticket validator to check the validity of the data. If the data stream decoded and unpacked from the card is valid, this data is sent to a packer object where the data is packed into a magnetic stripe format and sent back to the card reader for encoding.

The foregoing, together with other features and advantages of the present invention, will become more apparent when referring to the following specification, claims and accompanying drawings.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which.

DETAILED DESCRIPTION OF THE DRAWINGS

Figure 1:
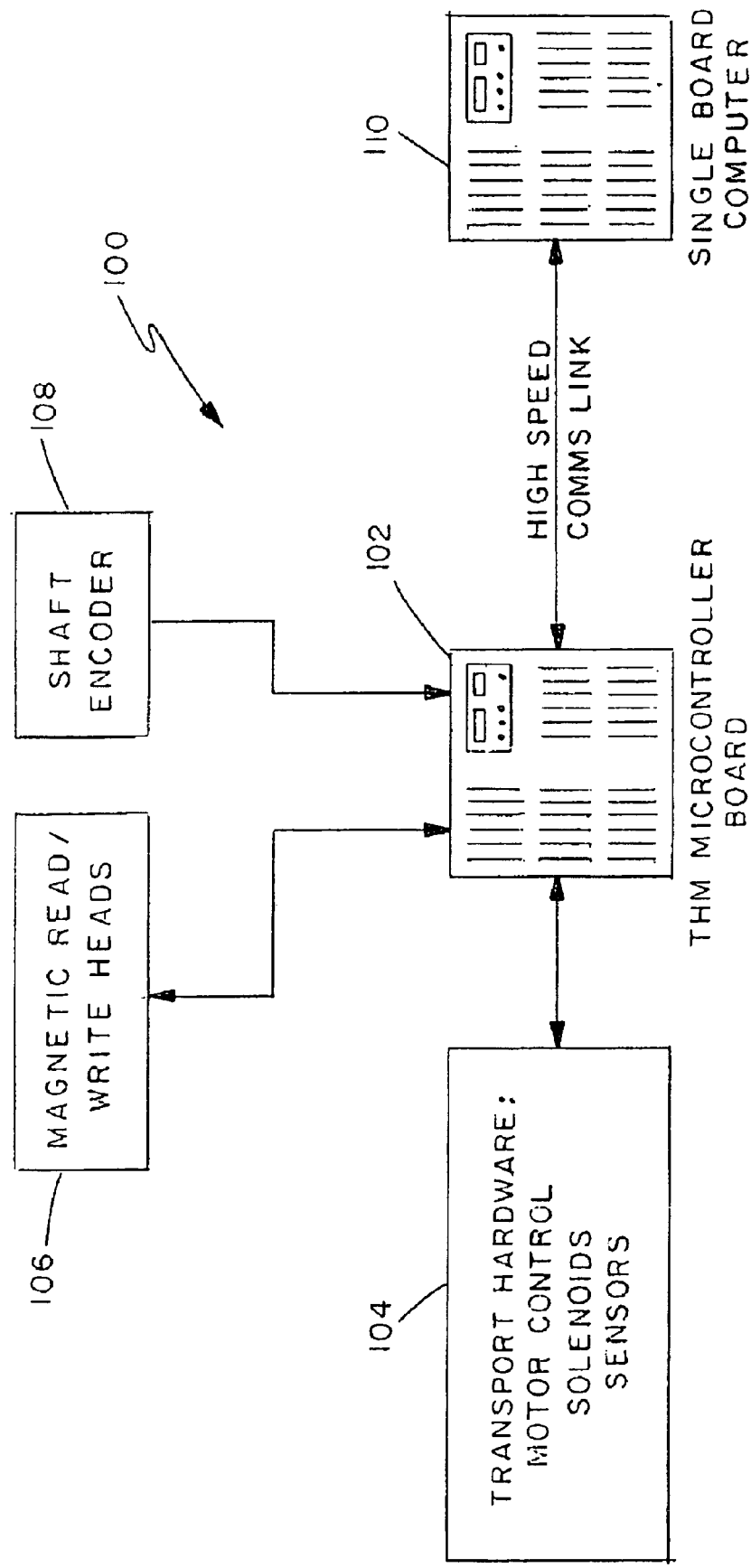
FIG. 1 shows a system utilized to decode or encode data contained on the magnetic stripes of cards.

FIG. 1 illustrates a system 100 utilized to decode or encode information on the magnetic stripes of cards. The system comprises a Ticket Handling Module (THM) Micro Controller Board 102 that continually monitors the system for insertion of a magnetic stripe card, such as fare media or credit cards. When a card has been inserted in the system 100, the Micro Controller Board 102 sends a signal to transport hardware 104 which captures the card and places the card on a transport belt (not shown). Simultaneously, a motor control, located in the transport hardware 104, energizes motors which in turn activates the transport belt causing the belt to rotate. The rotating transport belt passes the card under magnetic read/write heads 106 at a constant velocity for decoding (reading) and encoding (writing) information on the magnetic stripe of the card. Solenoids are utilized to encode data onto the magnetic stripe by methods well known in the art. Sensors are utilized to detect when the card is in the proper location within the system for encoding and decoding of data. In an alternative embodiment, a "swipe" machine can be utilized instead of an "insertion" machine as the card reader.

The magnetic stripe of the card is used to store information or data. Data can include account information, such as a credit card number and expiration date and information relating to transit fares. The magnetic stripe is comprised of cells and the data encoded on the card is stored in the cells by way of flux transitions. Each of the cells is the same length and the length of the cell is determined by the bit density of the card. The bit density is a measure of how close together the flux transitions are. Typical magnetic stripe cards use F2F encoding to encode the data. In F2F encoding, cells are marked by a beginning and an end, or boundaries. If a flux transition occurs within the boundaries of a cell, then the value of the cell is considered to be a "1". The system 100 uses the ¾ cell time to determine if a flux transition is present within the cell. ¾ cell time is ¾ of the length of the cell, therefore if the flux transition occurs up to and including ¾ the length of the cell (¾ cell time), then the cell is counted as a "1". ¾ is the industry standard for monitoring for a flux transition, however this can be changed to any length including, but not limited, to ⅞, 51% and 63% the length of the cell.

Since ¾ cell time is ¾ the length of a cell, this time can vary depending on the bit density of the card. By being able to encode or decode data on magnetic stripe cards of any density, the system of the present invention can accept cards with various bit densities and encoding formats. For cards of unknown bit densities, the system must determine what the ¾ cell time is before data can be decoded from the card. Without knowing the ¾ cell time, the system cannot determine if a flux transition has occurred within the cell boundaries.

To encode/decode data of a card with an unknown bit density, the system must first determine the velocity of the transport belt, or the capstan speed. To determine the velocity, a shaft encoder 108 is utilized. The shaft encoder 108 counts the number of rotations of the belt per a unit time. Based upon the number of rotations of the belt in a given amount of time, the speed of the belt is calculated and the information is transmitted to the Micro Controller Board 102.

Next, the system utilizes leading zeros which are contained on magnetic stripe cards to compute the ¾ cell time. The leading zeros are a marker on the front of the ticket that indicate a known distance. Based upon the leading zeros, the system knows what a "zero" cell looks like and as a result, knows what a "one" cell looks like. Leading zeros are only needed if the density of the card is not recognized by the system The cell times on the leading edge of the card will be measured and this data will be used to calculate the ¾ cell time by calculating the average cell time of the leading zeros and then taking ¾ of that time. As the media passes over the read head, the cell times are measured. An internal timer on the THM Micro Controller Board 102 is used to measure the time interval between the flux reversals (cell time), thus the cell time is measured.

Once the read/write heads have read the data from the card, the information is transmitted, on the fly, to a Single Board Computer (SBC) or demodulator 110, over a high speed communication link, in the form of a message that consists of a preamble, body and a post amble. The preamble contains the belt velocity information and is transmitted when the velocity measurement is complete. The body of the message contains the distance from the leading edge of the media to the first flux reversal and the time interval between flux reversals (cell time). This information is transmitted, on the fly, as the flux reversals are detected. The post amble is an accumulated CRC that allows the demodulator 110 to authenticate the message. Once the demodulator 110 receives the message, the demodulator 110 determines if it has the ability to demodulate and decode the data on the magnetic stripe based upon the bit density of the card. Furthermore, the data can also be used for analysis.

Figure 2:
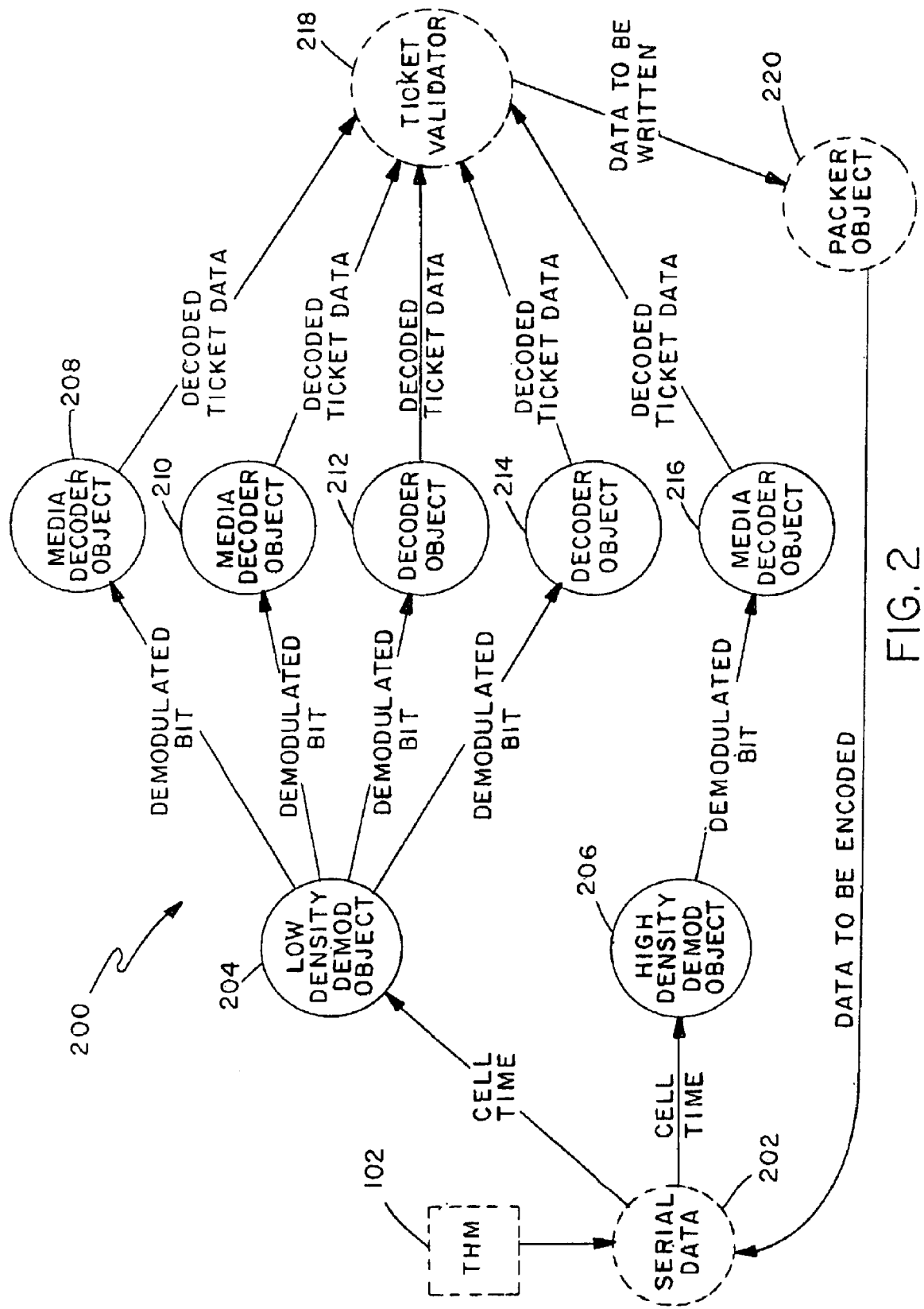
FIG. 2 shows a flow diagram illustrating the process to determine if the system can support the bit density of the card.

FIG. 2 is a flow diagram 200 illustrating the process utilized by the demodulator to determine if it can demodulate and decode the data. In this process, the Micro Controller 102 transmits a data packet, containing the cell time data read from the card by the magnetic read/write heads 104, to the demodulator 110 in the form of serial data 202. As described previously, the data packet consists of a preamble, body and post amble. The preamble contains the transport belt velocity and is transmitted when the velocity measurement is complete and is utilized when the card is of an unknown bit density. The body of the data packet contains the distance from the leading edge of the media to the first flux reversal and the time interval between flux reversals (cell time). The cell time is used to establish the ¾ cell time to determine if a flux reversal or transition has occurred. The postamble is an accumulated Cyclic Redundancy Check (CRC) that allows the demodulator 110 to authenticate the data packet by detecting data transmission errors.

Once the serial data 202 is received, the cell time data (which indicates the bit density of the card) contained in the body of the message is read by the demodulator. If the demodulator supports the bit density of the card, the cell time data is sent to the appropriate demodulator object 204, 206 which receives the cell time data and converts the data to a data stream representing the data that was encoded on the magnetic stripe of the card. This is accomplished by determining if a flux transition has occurred within the ¾ cell time. The appropriate demodulator object is determined by the bit density of the card. Each demodulator object supports a specific density supported by the demodulator. FIG. 2 illustrates two demodulator objects, a low density demodulator object 204 and a high density demodulator object 206. If the bit density of the card is supported by the low density demodulator object 204 (i.e. the flux transitions are closer together), that is where the cell time data is transmitted. If the bit density of the card is supported by the high density demodulator object 206 (i.e. the flux transitions are farther apart), that is where the cell time data is transmitted. Although two demodulator objects are shown in FIG. 2, a low density demodulator object 204 and a high density demodulator object 206, those skilled in the art will recognize that any number of demodulator objects may be implemented. The demodulator object converts binary encoded data on the card to a string of ASCII characters. A binary one is represented as an ASCII one and a binary zero is represented as an ASCII zero. Cell times that do not meet the criteria of a one or a zero are represented as an ASCII zero. This output is suitable for display or further processing.

If the bit density is not supported by the demodulator, i.e. the demodulator does not contain a demodulator object that supports the bit density of the card and can convert the data from the card, a new demodulator object to accept the data of the unknown bit density can be instantiated. As discussed previously, the system utilizes the leading zeros encoded on the magnetic stripe cards to determine the ¾ cell time. Based on this information, the bit density of the card can be determined using the velocity of the transport belt contained in the preamble of the data packet and the time between flux transitions. The bit density is equal to the inverse of the transport speed multiplied by the average cell time. A demodulator object can then be instantiated to accommodate the new bit density.

Furthermore, if the card contains a known bit density but the system does not contain a demodulator object which supports the bit density, demodulator objects can also be instantiated for known bit densities. The velocity information in the message preamble and the known bit density are used to compute the expected cell timing parameters. Based upon this information, a new demodulator object can be instantiated.

The demodulator object converts the flux transition time intervals by computing the cell boundary interval and monitoring for a flux change within the cell boundary. As described previously, the absence of a flux change within the boundary is defined as a zero and the presence of a flux change within the cell boundary is defined as a one.

Once the cell time data has been converted to a data stream, the demodulator object sends this data stream to a decoder object or media type. FIG. 2 illustrates five different media types 208, 210, 212, 214, 216. Media types are credit cards and various types of fare media cards, Although a system supporting five different media types is shown, one skilled in the art will recognize that any number of media types can be supported. The decoder object receives the data stream from the demodulator object and the object decodes and unpacks the data stream. Data bits other than 1 or 0 are ignored.

Once the decoder object decodes and unpacks the data stream, the data stream is sent to the ticket validator 218. The ticket validator determines the validity of the card presented using the CRC contained in the post amble of the data packet. If the data stream decoded and unpacked from the card is valid, this information is sent to a packer object 220. The packer object 220 packs the data into a magnetic stripe format and sends the data to the Micro Controller 102. The Micro Controller 102 then can modify the data, such as deduct the appropriate fare from the card if the card is being utilized for a transit system, and encode the data on the card. The Micro Controller 102 can encode data onto the magnetic stripe of the card at standard densities using shaft encoder timing or at programmable densities using the internal timers of the Micro Controller 102. The shaft encoder 108 encodes data onto the card at a specific density. If the density required is not supported by the shaft encoder 108, internal timers of the Micro Controller 102 can be used to simulate a shaft encoder to encode the proper bit density.

Figure 3:
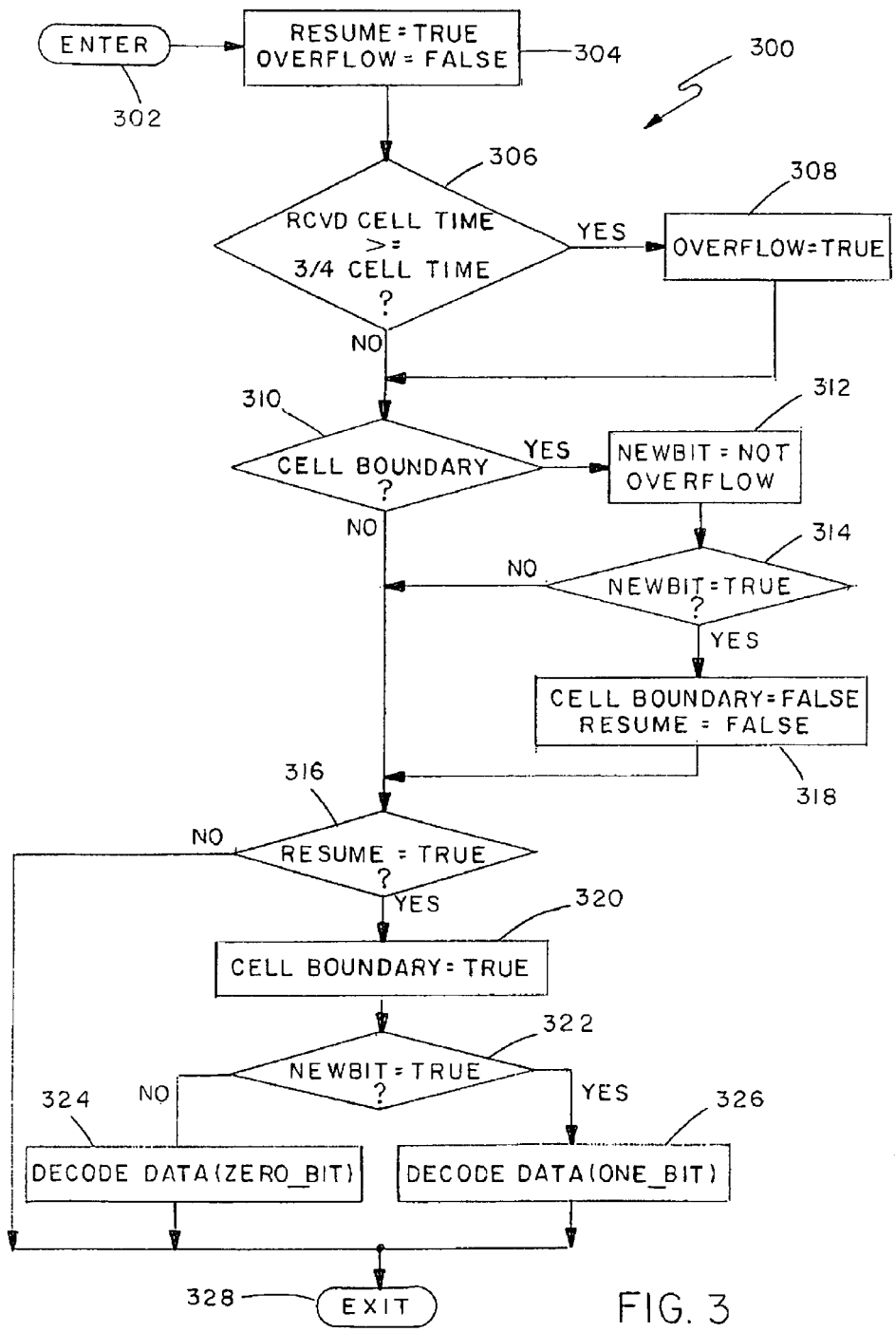
FIG. 3 shows a flow diagram illustrating the demodulator process.

FIG. 3 is a flow diagram illustrating the demodulator process 300 utilized by the demodulator objects 204, 206 of FIG. 2 to convert the intervals between the flux transitions to a stream of ASCII date that represents the data encoded on the magnetic stripe of the card. The demodulator object converts the flux transition time intervals by computing the cell boundary interval and monitoring for a flux e within the cell boundary. The absence of a flux change within the boundary is defined as a zero. The presence of a flux change within the cell boundary is defined as a one.

A data packet is sent 302 to the demodulator object causing a resume flag to be set to true and an overflow flag to be set to false 304. These flags are utilized to determine the cell boundary interval (cell time) and when a flux reversal or transition has occurred. The resume flag indicates the end of the cell or the cell boundary. Once the cell boundary has been reached, the resume flag is set to false. The overflow flag indicates that a flux transition has not yet occurred and the counter is still counting to determine the cell boundary interval or cell time and the system continues to check for the cell boundary.

Once the data packet from the Micro Controller 102 has been received, the demodulator object first checks to see if the received cell time is greater than or equal to the ¾ cell time 306. If the answer is "yes" the overflow flag is changed to true 308 because the demodulator only checks the length of the cell to the ¾ cell time to determine if a flux transition has occurred. When the cell time is the ¾ cell time, the system knows if there is a flux transition in the cell and the counter can stop counting, thus the overflow is set to true and the demodulator object checks to see if the cell boundary has been reached 310. If the received cell time is not greater than or equal to the ¾ cell time, the demodulator object maintains the overflow flag at false and checks if a cell boundary has been reached 310.

If a call boundary has been reached, a newbit flag is changed to "not overflow" 312 indicating that the bit that was just decoded is the complement of the overflow flag. The newbit flag represents the demodulated bit and is a holder so the bit may be passed on to the decoder object when the entire bit cell has ben processed. Next, the demodulator rechecks to see if the newbit flag is a to true 314, in other words, the demodulator object is confirming that a cell boundary has been read (i.e. a cell boundary flag is set to false). If the newbit flag is false (zero), then the end of the bit cell has been reached. If the newbit flag is true, the cell boundary flag is set to false and the resume bit is set to false 318 and the demodulator object waits for the next flux transition which will mark the End of the bit cell. When the demodulator is checking to ascertain if the resume bit is "true", the demodulator is waiting until the next flux transition. If the answer is "no", the demodulator object checks to see if the resume bit is true 316.

If the resume bit is "false", the data has been read from cell and the next cell is read. If the resume bit is "true" 316, the cell boundary flag is set to "true" 320. Next, the demodulator object checks to see if the new bit flag is "true" 322. If the new bit is not "true", the decoded data is "0" and there is no flux transition 324. If the newbit is true, the decoded data is "1" and there is a flux transition 326. This demodulated data is then sent to a decoder object. This process continues until all the cells have been checked, with et at step 328.

Although an exemplary embodiment of the invention has been described above by way of example only, it will be understood by those skilled in the field that modifications may be made to the disclosed embodiment without departing from the scope of the invention, which is defined by the appended claims.

We claim:

1. A method for reading data stored on a magnetic stripe of a media card of any bit density, the method comprising the steps of:
   determining the bit density of the card by measuring the length of 4 cells located on the magnetic stripe of the card;
   transmitting the bit density and data contained in the cells to a demodulator via a data packet, the demodulator comprising at least one demodulator object and at least one decoder object;
   determining if the bit density of the card is supported by the demodulator by determining if the at least one demodulator object recognizes the bit density of the card and can demodulate the data contained on the card; and
   transmitting the data to the demodulator object for demodulation of the data if the at least one demodulator object recognizes the bit density of the card.

2. The method of claim 1, wherein the demodulated data is a string of ASCII characters.

3. The method of claim 2, further comprising the step of transmitting the demodulated data to the at least one decoder object or decoding and unpacking said demodulated data, if the at least one decoder object recognizes the type of card.

4. The method of claim 3, further comprising the step of instantiating another decoder object which recognizes the type of card.

5. The method of claim 3, wherein the length of the cells are measured by an internal timer of the card reader.

6. The method of claim 1, wherein data encoded on the card is represented by a flux transition.

7. The method of claim 6, further comprising the step of the at least one demodulator object monitoring the cell for the flux transition.

8. The method of claim 6, further comprising the step of determining a ¾ cell time of the cells on the magnetic stripe, if the card is of an unknown bit density, by measuring the cell times of leading zeros encoded on the card, calculating an average cell time and taking ¾ of the average cell time.

9. The method of claim 8, further comprising the step of:
   calculating the unknown bit density by taking an inverse of the velocity of the belt multiplied by the average cell time; and
   instantiating another demodulator object which supports the bit density of the card.

10. The method of claim 1, further comprising the step of measure the velocity of a transport belt of a card reader wherein the card reader captures the card, places the card on the transport belt and passes the card under a read head.

11. The method of claim 10, wherein the velocity of the transport belt is measured using a shaft encoder by counting the number of rotations of the belt per a unit time.

12. The method of claim 11, wherein the velocity is transmitted to the demodulator in a preamble of the data packet.

13. The method of claim 1, wherein the card is a credit card.

14. The method of claim 1, wherein the card is a fare media card.

15. A method for reading data stored on a magnetic stripe of a media card of any bit density, the method comprising the steps of:
   determining the bit density of the card by measuring the length of cells located on the magnetic stripe of the card;
   transmitting the bit density and data contained in the cells to a demodulator via a data packet, the demodulator comprising at least one demodulator object and at least one decoder object;
   determining if the bit density of the card is supported by the demodulator by determining if the at least one demodulator object recognizes the bit density of the card and can demodulate the data contained on the card; and
   instantiating another demodulator object which supports the bit density of the card if the at least one demodulator object does not recognize the bit density of the card.

16. The method of claim 15, further comprising the step of measuring the velocity of a transport belt of a card reader wherein the card reader captures the card, places the card on the transport belt and passes the card under a read head.

17. The method of claim 16, wherein the velocity of the transport belt is measured using a shaft encoder by counting the number of rotations of the belt per a unit time.

18. The method of claim 17 further comprising the stop of determining a ¾ cell time of the cells on the magnetic stripe, if the card is of an unknown bit density, by measuring the cell time of leading zeros encoded on the card, calculating an average cell time and taking ¾ of the average cell time.

19. The method of claim 18, further comprising the step of calculating the bit density by taking an inverse of the velocity of the belt multiplied by the average cell time.

20. The method of claim 19 wherein the length of the cells are measure by an internal timer of the card reader.

21. The method of claim 20, further comprising the step of transmitting the data to the another demodulator object for demodulation of the data.

22. The method of claim 21 wherein the demodulated data is a string of ASCII characters.

23. The method of claim 22, further comprising the step of transmitting the demodulated data to the at least one decoder object for decoding and unpacking the demodulated data, if the at least one decoder object recognizes the type of card.

24. The method of claim 23 further comprising the step of instantiating another decoder object which recognizes the type of card.

25. The method of claim 15 wherein the card is a credit card.

26. The method of claim 15 wherein the card is a fare media card.

27. An apparatus for reading data stored on a magnetic stripe of a media card of any bit density, the apparatus comprising:
- a card reader for reading the data encoded on the magnetic stripe of the card; and
- a demodulator connected to the card reader via a communication link, the demodulator comprising:
  - at one demodulator object for demodulating the data read from the card if the at least one demodulator object recognizes the bit density of the card; end
  - at least one decoder object, coupled to the at least one demodulator object, for decoding and unpacking the demodulated data, if the at least one decoder object recognizes the type of card.

28. The apparatus of claim 27, wherein the data is transmitted from the card reader to the demodulator via a data packet which contains the velocity of a transport belt used to transport the belt within the card reader and the data read from the card.

29. The apparatus of claim 27, wherein the data is stored on the card in cells and the data is represented by flux transitions.

30. The apparatus of claim 27, wherein the bit density of the card is calculated if the bit density is not recognized by the at least one demodulator object.

31. The apparatus of claim 27, wherein a ¾ cell time of the cells on the magnetic stripe is calculated by measuring the cell times of leading zeros encoded on the card and taking an average of the cell times measured.

32. The apparatus of claim 27, wherein if the bit density is not recognized by the at least one demodulator object, the bit density is calculated by taking an inverse of the velocity of the belt multiplied by the 4 average cell time.

33. The apparatus of claim 27, wherein another demodulator object is instantiated if the at least one demodulator object does not recognize the bit density of the card.

34. The apparatus of claim 27, wherein another decoder object is instantiated if the at least one decoder object does not recognize the type of card.

35. The apparatus of claim 27, wherein the card is a credit card.

36. The apparatus of claim 27, wherein the card is a fare media card.

* * * * *